(12) United States Patent
Nomachi

(10) Patent No.: US 9,699,616 B2
(45) Date of Patent: *Jul. 4, 2017

(54) MOBILE ELECTRONIC DEVICE AND METHOD

(71) Applicant: KYOCERA Corporation, Kyoto-shi, Kyoto (JP)

(72) Inventor: Nayu Nomachi, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/934,027

(22) Filed: Nov. 5, 2015

(65) Prior Publication Data

US 2016/0057584 A1 Feb. 25, 2016

Related U.S. Application Data

(63) Continuation of application No. 13/428,161, filed on Mar. 23, 2012, now Pat. No. 9,215,311.

(30) Foreign Application Priority Data

Mar. 25, 2011 (JP) .................................. 2011-068970

(51) Int. Cl.
 *H04W 4/02* (2009.01)
 *G01C 21/20* (2006.01)
 (Continued)

(52) U.S. Cl.
 CPC ............ *H04W 4/028* (2013.01); *G01C 21/20* (2013.01); *H04M 1/2745* (2013.01);
 (Continued)

(58) Field of Classification Search
 CPC ................................. H04W 4/02; H04W 64/00
 (Continued)

(56) References Cited

U.S. PATENT DOCUMENTS 5,470,233 A 11/1995 Fruchterman et al.
6,246,376 B1 * 6/2001 Bork ....................... G01S 1/047
 342/357.34

(Continued)

FOREIGN PATENT DOCUMENTS

JP 7-294274 A 11/1995
JP 2001-124581 A 5/2001
 (Continued)

OTHER PUBLICATIONS

Office Action mailed Oct. 21, 2014, corresponding to Japanese patent application No. 2011-068970, for which an explanation of relevance is attached.

(Continued)

*Primary Examiner* — Marisol Figueroa
(74) *Attorney, Agent, or Firm* — Hauptman Ham, LLP

(57) ABSTRACT

A mobile electronic device includes a detector unit configured to detect a position and an orientation of the mobile electronic device and a control unit. The control unit monitors the orientation of the mobile electronic device for a predetermined period when the control unit detects a change of the orientation of the mobile electronic device from a former orientation. The control unit determines that a corner is detected when the mobile electronic device does not return to the former orientation within the predetermined period, and determines that the corner is not detected when the mobile electronic device returns to the former orientation within the predetermined period.

8 Claims, 15 Drawing Sheets

(51) Int. Cl.
*H04M 1/2745* (2006.01)
*H04M 1/725* (2006.01)

(52) U.S. Cl.
CPC ....... *H04M 1/72572* (2013.01); *H04W 4/026* (2013.01); *H04W 4/027* (2013.01); *H04M 2250/10* (2013.01)

(58) Field of Classification Search
USPC .............................................. 455/456.1–457
See application file for complete search history.

(56) References Cited

U.S. PATENT DOCUMENTS

| | | | |
|---|---|---|---|
| 6,426,709 B1 | 7/2002 | Becker et al. | |
| 7,248,872 B2 | 7/2007 | Bassett et al. | |
| 7,606,663 B2 | 10/2009 | Neef et al. | |
| 8,315,801 B2 | 11/2012 | Takagi | |
| 2005/0136912 A1 | 6/2005 | Curatolo et al. | |
| 2005/0171694 A1* | 8/2005 | Schirmer ........... | G01C 21/3626 701/411 |
| 2006/0155466 A1 | 7/2006 | Kanda et al. | |
| 2009/0221298 A1* | 9/2009 | Hanner ................ | G01C 21/08 455/456.1 |
| 2011/0028164 A1 | 2/2011 | Kato | |
| 2011/0046878 A1 | 2/2011 | Sung et al. | |
| 2011/0300876 A1 | 12/2011 | Lee et al. | |

FOREIGN PATENT DOCUMENTS

| | | |
|---|---|---|
| JP | 2003-6219 A | 1/2003 |
| JP | 2004-28651 A | 1/2004 |
| JP | 2005-274244 A | 10/2005 |
| JP | 2006-194665 A | 7/2006 |
| JP | 2007-200173 A | 8/2007 |
| JP | 2007-271357 A | 10/2007 |
| JP | 2008-58267 A | 3/2008 |
| JP | 2009-63580 A | 3/2009 |
| JP | 2010-25845 A | 2/2010 |

OTHER PUBLICATIONS

Office Action mailed Jun. 2, 2015, corresponding to Japanese patent application No. 2011-068970, for which an explanation of relevance is attached.

Office Action in JP Application No. 2016-028347, mailed Oct. 18, 2016, for which an explanation of relevance is attached.

* cited by examiner

| Name | Telephone Number | Mail Address | ... |
|---|---|---|---|
| Tanaka | XXX-XXXX-XXXX | tanaka@example.com | ... |
| Suzuki | XXX-XXXX-XXXX | suzuki@example.com | ... |
| Yamada | XXX-XXXX-XXXX | yamada@example.com | ... |
| Sato | XXX-XXXX-XXXX | sato@example.com | ... |
| Takahashi | XXX-XXXX-XXXX | takahashi@example.com | ... |
| Ito | XXX-XXXX-XXXX | ito@example.com | ... |
| ... | ... | ... | ... |

FIG.8

| Footprint ID | Creator's Account | Name of Footprint |
|---|---|---|
| F00001 | kato@example.com | Directions to Kato's house |
| ... | ... | ... |

```
<footprintInformation>
<footprintId>F00001</footprintId>
<serialNumber>3</serialNumber>
<latitude>xxxxxx</latitude>
<longitude>yyyyyy</longitude>
<type>straight</type>
<orientation>north</orientation>
</footprintInformation>
```

FIG.10

| Footprint ID | Serial Number | Latitude | Longitude | Type | Orientation |
|---|---|---|---|---|---|
| F00001 | 1 | xxxxxx | yyyyyy | Start | North |
| F00001 | 2 | xxxxxx | yyyyyy | Straight | North |
| F00001 | 3 | xxxxxx | yyyyyy | Straight | North |
| ... | ... | ... | ... | ... | ... |
| F00001 | 8 | xxxxxx | yyyyyy | Left turn | North |
| F00001 | 9 | xxxxxx | yyyyyy | Straight | West |
| F00001 | 10 | xxxxxx | yyyyyy | Straight | West |
| F00001 | 11 | xxxxxx | yyyyyy | Goal | West |
| ... | ... | ... | ... | ... | ... |

FIG.11

| Footprint ID | Access-Authorized Account |
|---|---|
| F00001 | yamada@example.com |
| ... | ... |

US 9,699,616 B2

MOBILE ELECTRONIC DEVICE AND METHOD

CROSS-REFERENCE TO RELATED APPLICATIONS

The present application is a continuation of U.S. patent application Ser. No. 13/428,161, filed Mar. 23, 2012, which claims priority from Japanese Application No. 2011-068970, filed on Mar. 25, 2011, the contents of which are incorporated by reference herein in their entirety.

BACKGROUND

1. Technical Field

The present disclosure relates to a mobile electronic device and a method.

2. Description of the Related Art

A technology is known in which a history of a route through which one moves is created by acquiring map information through Internet connection and also acquiring current position information from a global positioning system (GPS) satellite and a result of the creation is displayed on a display unit of a mobile phone (see, for example, Japanese Patent Application Laid-Open No. 2001-124581).

However, the above-mentioned technology for creating the history of the route through which one moves using map information cannot be used when a route not contained in the map information, such as a small alley or a road that has just opened, is included somewhere in the route.

SUMMARY

According to an aspect, a mobile electronic device includes a communication unit, and a control unit. The communication unit communicates with a server that causes a terminal to display a virtual object associated with position information in such a way that the virtual object is superimposed on an image captured by the terminal. When a position of the mobile electronic device changes, the control unit generates mark information based on the changed position. The control unit causes the communication unit to transmit the generated mark information, as the position information, to the server.

According to another aspect, a method is executed by a mobile electronic device. The method includes: generating mark information, when a position of the mobile electronic device changes, based on the changed position; and transmitting the generated mark information as position information to a server. The server causes a terminal to display a virtual object associated with the position information in such a way that the virtual object is superimposed on an image captured by the terminal.

BRIEF DESCRIPTION OF THE DRAWINGS

FIG. 3 is a diagram illustrating an example of address book data;

FIG. 8 is a diagram illustrating an example of footprint management data;

FIG. 9 is a diagram illustrating an example of footprint information to be transmitted;

FIG. 10 is a diagram illustrating an example of footprint data;

FIG. 11 is a diagram illustrating an example of access control data;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the mobile electronic device; however, the present invention is not limited to mobile phones. Therefore, the present invention can be applied to any type of devices provided with a display unit, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
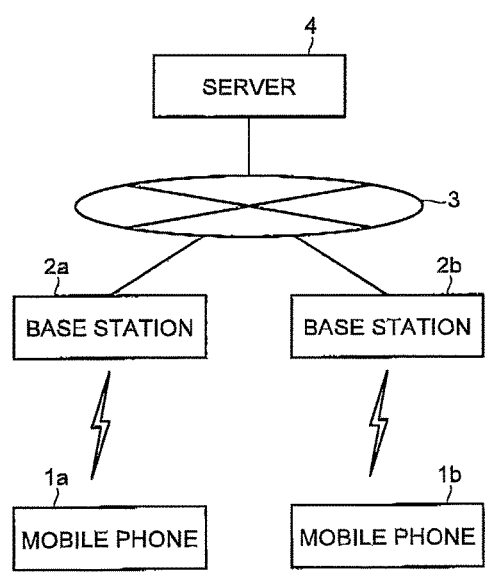
FIG. 1 is a diagram illustrating a configuration of a footprint-information management system according to an embodiment.

First, a footprint-information management system according to a present embodiment will be explained below with reference to FIG. 1. FIG. 1 is a diagram illustrating a configuration of the footprint-information management system according to the present embodiment. As illustrated in FIG. 1, the footprint-information management system according to the present embodiment includes a mobile phone 1a, a mobile phone 1b, a base station 2a, a base station 2b, and a server 4.

The base station 2a, the base station 2b, and the server 4 are connected to a network 3 such as the Internet. The base station 2a establishes a wireless communication path with the mobile phone 1a. The base station 2b establishes a wireless communication path with the mobile phone 1b. A correspondence between the mobile phone and the base station is not fixed, and therefore the base station that establishes the wireless communication path with the mobile phone can be changed according to movement or the like of the mobile phone.

The server 4 provides augmented reality (AR) service. The AR service is a service to display a photographed real image with a virtual object superimposed thereon. Moreover, the server 4 distributes footprint information (mark information) to display a plurality of virtual objects indicating directions superimposed on a real image, according to a request from a terminal such as the mobile phone 1b. The server 4 stores, in addition to footprint information to be distributed, control information to restrict users authorized to access the footprint information. Because the server 4 controls the distribution of the footprint information based on the control information, even if a plurality of terminals receive the distribution of the footprint information at the same location, the virtual object may be differently displayed on the respective terminals.

The mobile phone 1a records footprint information indicating a moving route following a movement of its own device. The footprint information recorded by the mobile phone 1a is transmitted to the server 4 and is stored therein. The mobile phone 1a transmits specification information for specifying a user who uses the footprint information transmitted by its own device to the server 4. The specification information is, for example, identification information of a terminal or an account number of AR service.

The mobile phone 1b reproduces the footprint information recorded by the mobile phone 1a. Specifically, the mobile phone 1b displays a real image captured by a photographing unit on a display unit and also displays an object, corresponding to the footprint information distributed from the server 4, superimposed on the image. The mobile phone 1b transmits an account number of the user and position information of the own device to the server 4 in order to receive distribution of the footprint information.

In this manner, the footprint-information management system according to the present embodiment is managed so that the footprint information recorded by user's terminal can be accessed only by the terminal of a specific user. The footprint information, which is superimposed on a real image, is displayed on the display unit of a terminal based on the AR technology. Therefore, by using the footprint-information management system according to the present embodiment, the user can inform only a specific acquaintance about a highly-confidential moving route such as directions to user's house in a very easy-to-understand way.

The configuration of the footprint-information management system illustrated in FIG. 1 is an example, and therefore the number of various devices included in the footprint-information management system is not limited. To simplify explanation, even if communication is performed via a base station such as the base station 2a, the base station may not be specifically referred to in the followings.

Figure 2:
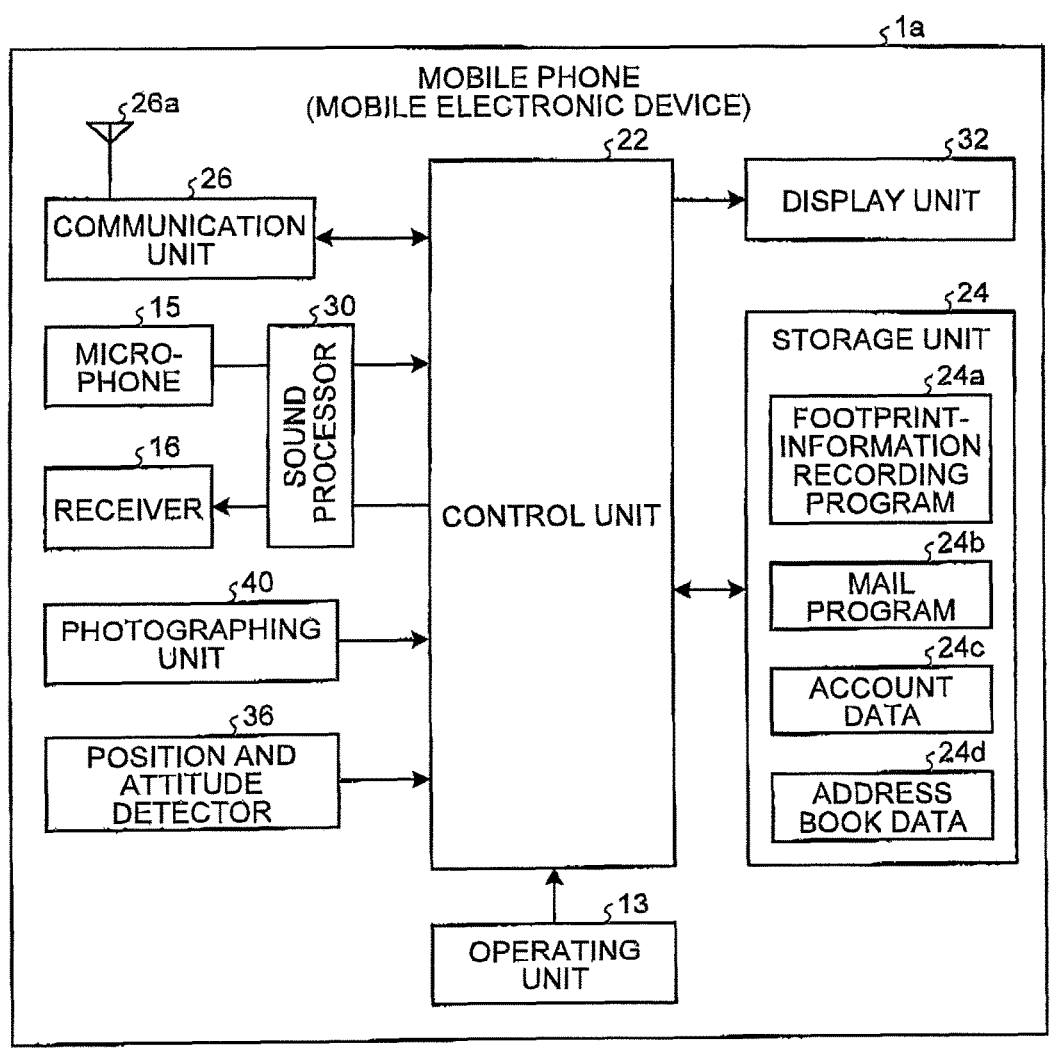
FIG. 2 is a block diagram of a first mobile phone.
Figure 4:
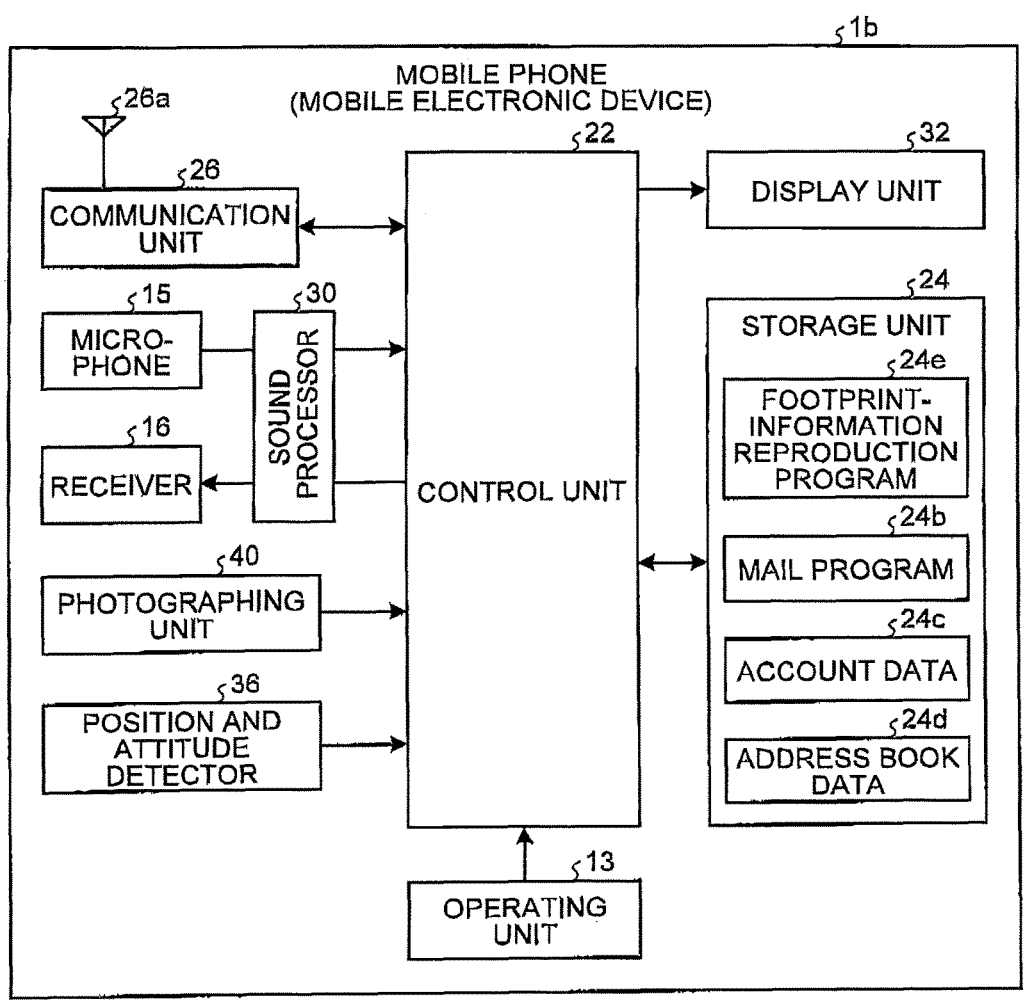
FIG. 4 is a block diagram of a second mobile phone.
Figure 5:
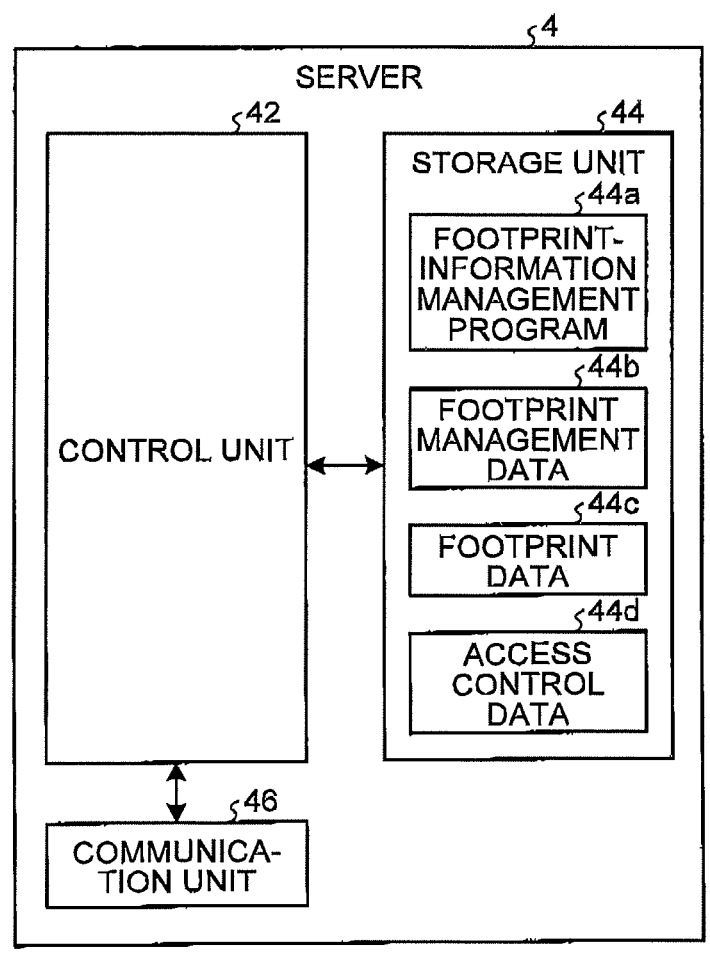
FIG. 5 is a block diagram of a server.

Next, functional configurations of the various devices illustrated in FIG. 1 are explained with reference to FIG. 2 to FIG. 5. FIG. 2 is a block diagram of the mobile phone 1a. FIG. 3 is a diagram illustrating an example of address book data. FIG. 4 is a block diagram of the mobile phone 1b. FIG. 5 is a block diagram of the server 4.

As illustrated in FIG. 2, the mobile phone 1a includes a communication unit 26, an operating unit 13, a sound processor 30, a display unit 32, a photographing unit 40, a position and attitude detector 36, a control unit 22, and a storage unit 24.

The communication unit 26 includes an antenna 26a, establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26. The operating unit 13 includes various keys such as an operation key, a direction key, and a decision key. When any of these keys is operated by the user, the operating unit 13 outputs a signal corresponding to the content of the operation to the control unit 22. The operating unit 13 may include a touch sensor placed over the display unit 32, instead of these keys, or in addition to these keys.

The sound processor 30 converts sound input from the microphone 15 into a digital signal and outputs the digital signal to the control unit 22. Moreover, the sound processor 30 decodes a digital signal output from the control unit 22 and outputs the decoded signal to the receiver 16. The display unit 32 displays various pieces of information according to a control signal input from the control unit 22. The photographing unit 40 converts a captured image into a digital signal and output the digital signal to the control unit 22.

The position and attitude detector 36 detects a position and an attitude of the own device (mobile phone 1a) and outputs a result of detection to the control unit 22. The attitude mentioned here represents a concept including a direction (orientation) and an angle in the vertical direction to which the mobile phone 1a is directed. The position and attitude detector 36 detects a position of the own device based on, for example, a global positioning system (GPS) receiver and/or a base station with which the communication unit 26 establish a wireless signal path. The position and attitude detector 36 detects an attitude of the own device based on, for example, a triaxial acceleration sensor, a direction sensor, and/or a gyro sensor.

The control unit 22 includes a central processing unit (CPU) being a computing unit and a memory being a storage unit, and implements various functions by executing programs using these hardware resources. Specifically, the control unit 22 reads a program and data stored in the storage unit 24 and loads them to the memory, and causes the CPU to execute instructions contained in the program loaded to the memory. The control unit 22 performs read/write of data from/to the memory and the storage unit 24 and controls the operation of the communication unit 26, the display unit 32, or the like according to the execution result of the instructions performed by the CPU. When the CPU executes the instruction, the data loaded to the memory and the signal input from the position and attitude detector 36 or the like are used as parameters.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 22. The programs and the data stored in the storage unit 24 include a footprint-information recording program 24a, a mail program 24b, account data 24c, and address book data 24d. The storage unit 24 may be configured by combining a portable storage medium such as a memory card and an optical disc with a reader/writer that performs read/write of data from/to the storage medium. In this case, the programs and the data supposed to be stored in the storage unit 24 are stored in the portable storage medium. The programs and the data supposed to be stored in the storage unit 24 may be acquired from other device such as the server 4 through wireless communication performed by the communication unit 26.

The footprint-information recording program 24a provides a function of recording footprint information indicating a moving route following a movement of the mobile phone 1a. The content of the footprint information will be explained later with reference to FIG. 9. The footprint-information recording program 24a also provides a function of transmitting recorded footprint information to the server 4 where it is stored, and a function of specifying a user authorized to access the transmitted footprint information for the server 4.

The mail program 24b provides an electronic mail function. The account data 24c stores therein an account number (identification information) used when the user of the own device uses the services of the server 4. In the present embodiment, the user uses his/her mail address as an account number for using the services of the server 4; however, any value other than the mail address may be used as the account number. The address book data 24d stores therein information for persons at the other end of the line or of the mail communication. As illustrated in FIG. 3, the address book data 24d stores therein information such as names, telephone numbers, and mail addresses.

As illustrated in FIG. 4, the mobile phone 1b has the same configuration as that of the mobile phone 1a except for the storage unit 24 that stores a footprint-information reproduction program 24e instead of the footprint-information recording program 24a.

The footprint-information reproduction program 24e provides a function of displaying a virtual object superimposed on the image captured by the photographing unit 40 on the display unit 32, based on the AR technology. Specifically, the footprint-information reproduction program 24e provides a function of acquiring footprint information that the user of the own terminal can access from the server 4 and a function of displaying the object, corresponding to the footprint information, superimposed on the image. Hereinafter, the object corresponding to the footprint information may be called "AR tag".

As illustrated in FIG. 5, the server 4 includes a control unit 42, a storage unit 44, and a communication unit 46. The communication unit 46 controls communication with the various devices through the network 3. The control unit 42 includes CPU being a computing unit and a memory being a storage unit, and implements various functions by executing programs using these hardware resources.

The storage unit 44 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 42. The programs and the data stored in the storage unit 44 contain a footprint-information management program 44a, footprint management data 44b, footprint data 44c, and access control data 44d. The programs and the data supposed to be stored in the storage unit 44 may be stored in the portable storage medium and read from the storage medium by a reader (not illustrated) included in the server 4. The programs and the data supposed to be stored in the storage unit 44 may be acquired from other device through communication performed by the communication unit 46.

The footprint-information management program 44a provides a function of storing the footprint information transmitted from a terminal in the storage unit 44 and a function of distributing the footprint information stored in the storage unit 44 according to a request from a terminal. The footprint-information management program 44a also provides an access control function of distributing the footprint information only to the terminal of the user authorized to access.

The footprint management data 44b stores therein information such as creators and titles of footprint information stored in the storage unit 44. The footprint data 44c stores therein a substance of footprint information. The access control data 44d stores therein information for users authorized to access the footprint information. The configuration of the server 4 is not limited to FIG. 5. For example, part of the information stored in the storage unit 44 may be stored in the mobile phone 1a, and part of the processes may be performed by the mobile phone 1a.

Figure 6:
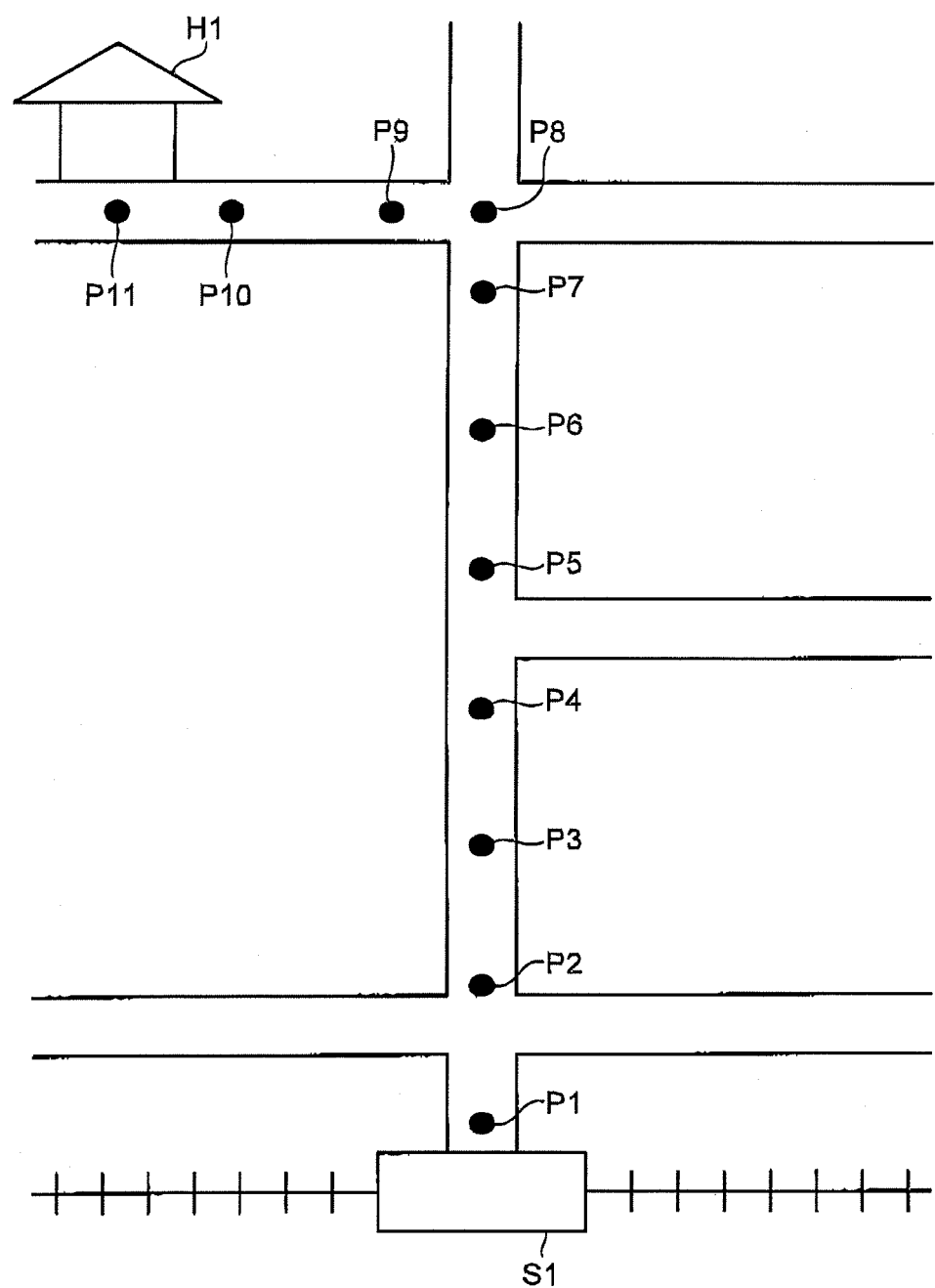
FIG. 6 is a diagram illustrating an example of a moving route.
Figure 7:
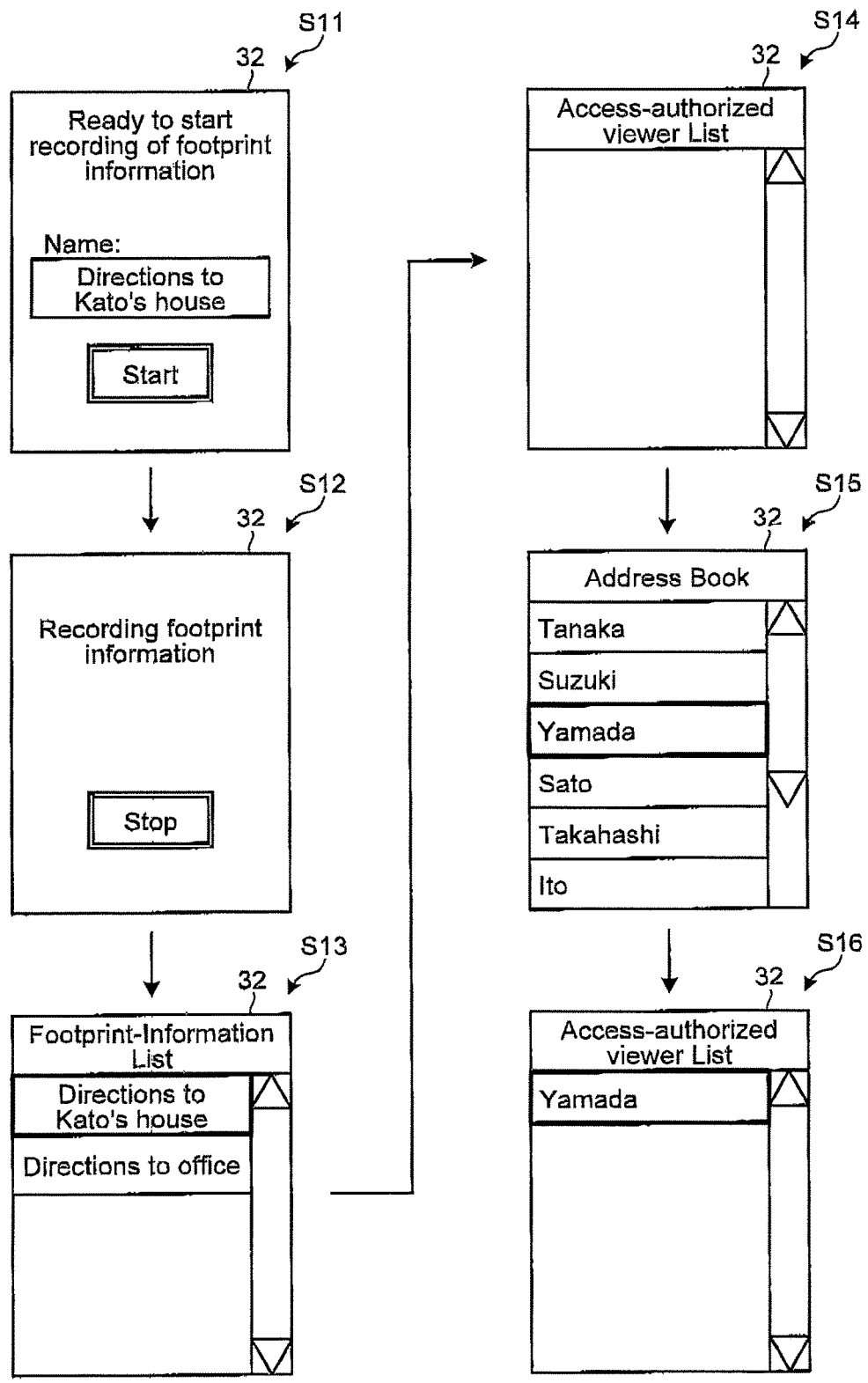
FIG. 7 is a diagram illustrating an example of screen transition in the first mobile phone.
Figure 12:
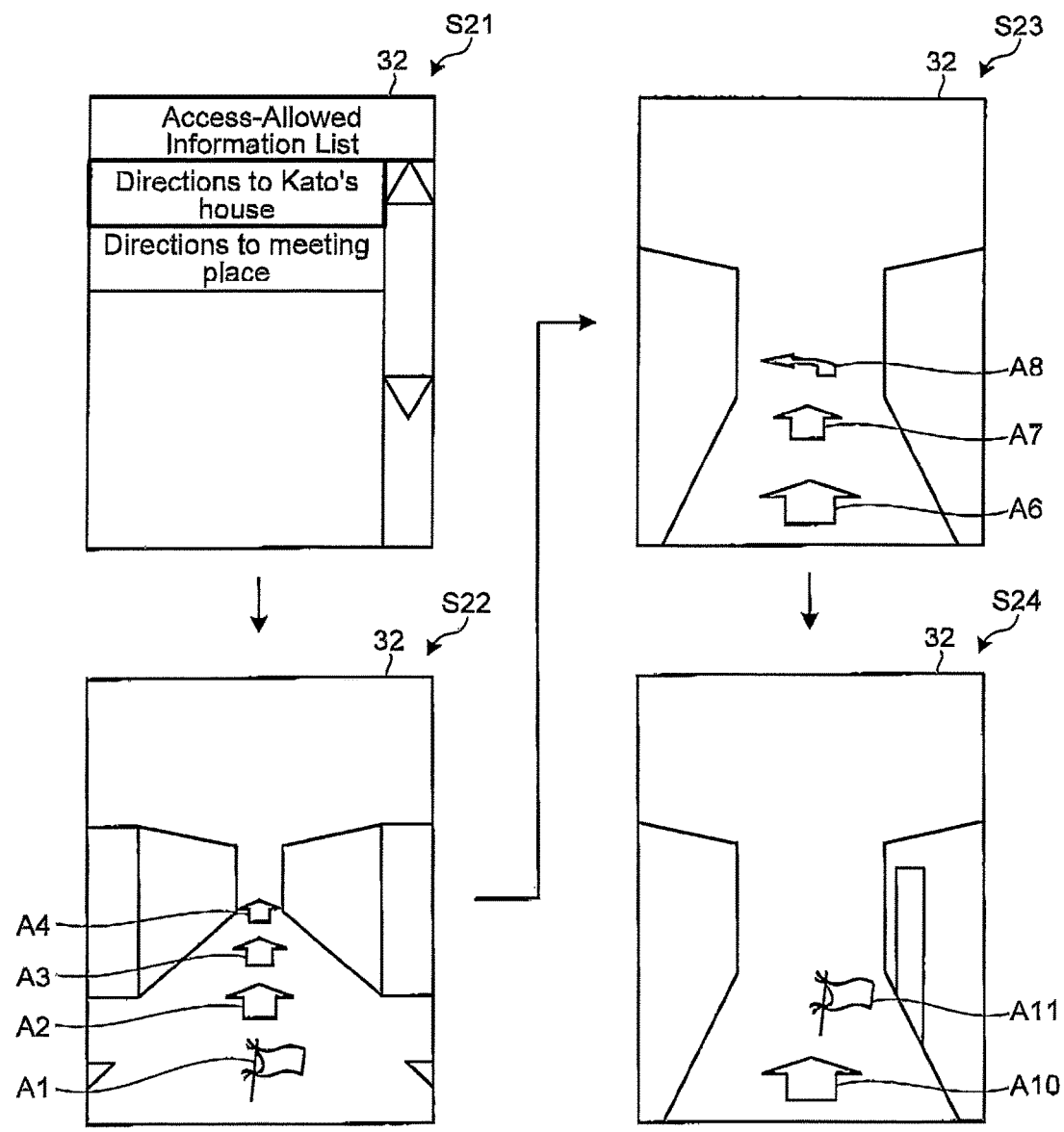
FIG. 12 is a diagram illustrating an example of screen transition in the second mobile phone.

Next, use examples of the footprint-information management system according to the present embodiment will be explained below with reference to FIG. 6 to FIG. 12. FIG. 6 is a diagram illustrating an example of a moving route. FIG. 7 is a diagram illustrating an example of screen transition in the mobile phone 1a. FIG. 8 is a diagram illustrating an example of the footprint management data 44b. FIG. 9 is a diagram illustrating an example of footprint information to be transmitted. FIG. 10 is a diagram illustrating an example of the footprint data 44c. FIG. 11 is a diagram illustrating an example of the access control data 44d. FIG. 12 is a diagram illustrating an example of screen transition in the mobile phone 1b.

A case is assumed, in which a user of the mobile phone 1a records a moving route (see FIG. 6) from station S1 to user's house H1 and informs the user of the mobile phone 1b about the moving route. In this case, the user of the mobile phone 1a operates the operating unit 13 of the mobile phone 1a at a point P1 around an exit of the station S1 to activate the footprint-information recording program 24a.

When the footprint-information recording program 24a is activated, the mobile phone 1a displays a recording start screen as illustrated at Step S11 of FIG. 7 on the display unit 32 based on the function provided by the footprint-information recording program 24a. Displayed on the recording start screen are a message indicating a start of recording of footprint information, an input field for inputting a name of the footprint information to be recorded, and a start button for starting recording of the footprint information.

When the user operates the operating unit 13 to input the name of the footprint information and selects the start button, the mobile phone 1a transmits the input name and the account number stored in the account data 24c to the server 4 to request a start of recording of the footprint information. The server 4 issues a footprint ID to identify a series of footprint information according to the request from the mobile phone 1a, and registers the issued footprint ID associated with the received name and account number in the footprint management data 44b as illustrated in FIG. 8. The server 4 also sends a response to the mobile phone 1a about the issued footprint ID.

The mobile phone 1a displays a recording stop screen as illustrated at Step S12 of FIG. 7 on the display unit 32. Displayed on the recording stop screen are a message indicating that recording of footprint information is in execution and a stop button for ending the recording of the footprint information. When confirming that the recording stop screen appears, the user of the mobile phone 1a starts moving to the user's house H1.

The mobile phone 1a generates footprint information at predetermined timings and transmits the generated footprint information to the server 4 during display of the recording stop screen. The predetermined timings mentioned here are, for example, a timing at which the recording of the footprint information is started, a timing periodically set at predetermined intervals, a timing at which the user turns a corner, and a timing at which the recording of the footprint information is stopped. By setting these timings, footprint information is transmitted to the server 4, for example, at each of points P1 to P11 illustrated in FIG. 6. However, the footprint information may be collectively transmitted to the server 4 after the recording thereof is stopped, instead of the transmission at each of the points from the start to the stop of the recording.

The footprint information transmitted from the mobile phone 1*a* to the server 4 contains items such as footprint ID (footprintId), serial number (serialNumber), latitude, longitude, type, and orientation, as illustrated in FIG. 9. The footprint ID is an identification number to identify a series of footprint information, and a value returned from the server 4 is set therein. The serial number is updated to increment the number by one each time footprint information is generated. The latitude and the longitude indicate a current location of the mobile phone 1*a* detected by the position and attitude detector 36.

The type indicates a status of the movement. Set in the type are values such as "Start" indicating a start point of recording, "Goal" indicating an end point of the recording, "Straight" indicating that it is moving straight, "Left turn" indicating turning left at a corner, and "Right turn" indicating turning right at a corner. The orientation indicates a current moving direction of the mobile phone 1*a* detected by the position and attitude detector 36.

The server 4 stores the received footprint information in the footprint data 44*c* as illustrated in FIG. 10. If it is detected that the user has turned the corner, the mobile phone 1*a* may shorten an interval, for a while, at which footprint information is periodically recorded, to increase a transmission frequency of the footprint information. In general, people tend to get lost at corners; however, the frequent recording of the footprint information around the corner in this way enables to prevent people from getting lost at corners.

When arriving at the user's house H1, the user of the mobile phone 1*a* operates the operating unit 13 to select the stop button on the recording stop screen. When the stop button is selected, the mobile phone 1*a* transmits the footprint information whose type is "Goal" to the server 4 at the end, and completes the recording of the foot print information.

Even if the stop button is not selected, if the position of the own device detected by the position and attitude detector 36 does not change for a given period of time or longer, the recording of the footprint information may be completed. By automatically completing the recording of the footprint information in this way, enormous amounts of footprint information can be prevented from being recorded even if the user forgets that the footprint information is being recorded.

When the recording of the footprint information is completed, the mobile phone 1*a* acquires a list of the footprint information recorded by the user of the own device from the server 4, and displays a footprint-information list screen on the display unit 32 as illustrated at Step S13 of FIG. 7. The footprint-information list screen can be displayed on the display unit 32 through user's predetermined operation even when it is not right after the recording of the footprint information is completed.

When the footprint-information list screen appears, the user operates the operating unit 13 to select the footprint information recorded this time. When the footprint information is selected, the mobile phone 1*a* inquires at the server 4 about information for users authorized to access the footprint information, and displays the result of the inquiry on an access-authorized viewer list screen. Because no user authorized to access the footprint information is specified at this step, information for any user does not appear on the access-authorized viewer list screen as illustrated at Step S14.

Subsequently, when the user performs a predetermined operation to the operating unit 13, the mobile phone 1*a* displays a list of names registered in the address book data 24*d*, as illustrated at Step S15 of FIG. 7. When the user selects "Yamada" being a name of the user of the mobile phone 1*b* from the list, the mobile phone 1*a* transmits the account number (mail address) corresponding to the selected "Yamada" and the footprint ID to the server 4 to request registration of the access-authorized viewer. The server 4 receives the account number and the footprint ID, and registers them in the access control data 44*d* in association with each other as illustrated in FIG. 11.

Thereafter, the mobile phone 1*a* again inquires at the server 4 about information for users authorized to access the footprint information, and displays the result of this on the access-authorized viewer list screen. At this step, because the account number of the user of the mobile phone 1*b* has been registered as the user authorized to access the footprint information, "Yamada" which is the name corresponding to the registered account number appears on the access-authorized viewer list screen.

Here, the example is illustrated, in which a person registered in the address book data 24*d* is specified as an access-authorized viewer; however, a member registered in schedule by a schedule function may be specified as an access-authorized viewer. For example, if a meeting will be held in a certain place and directions to the place of meeting are informed to a member who attends the meeting, this type of specifying method is useful.

It is assumed that, after the recording of the footprint information and the registration of the access-authorized user are completed, a user of the mobile phone 1*b* operates the operating unit 13 of the mobile phone 1*b* around the exit of the station S1 to activate the footprint-information reproduction program 24*e*.

When the footprint-information reproduction program 24*e* is activated, the mobile phone 1*b* displays an access-allowed information screen as illustrated at Step S21 of FIG. 12 on the display unit 32 based on the function provided by the footprint-information reproduction program 24*e*. Displayed on the access-allowed information screen is a list of results of which the mobile phone 1*b* transmits the account number stored in the account data 24*c* to the server 4 and inquires the footprint information that the user having the account number is authorized to access.

When the user operates the operating unit 13 to select the footprint information recorded by the mobile phone 1*a*, the mobile phone 1*b* requests distribution of the selected footprint information from the server 4. Subsequently, the mobile phone 1*b* starts reproduction of the distributed footprint information based on the AR technology.

Specifically, the mobile phone 1*b* activates the photographing unit 40 and displays an image captured by the photographing unit 40 on the display unit 32. The mobile phone 1*b* then selects the footprint information corresponding to an imaging range of the photographing unit 40 based on the position, the attitude, and so on detected by the position and attitude detector 36, and displays an AR tag, having a shape according to the value of the type of the selected footprint information, superimposed on the image on the display unit 32. The operation is repeatedly executed until the user performs a predetermined stop operation.

A correspondence between the position indicated by the footprint information and the imaging range of the photographing unit 40 is calculated based on the position and the attitude of the mobile phone 1b detected by the position and attitude detector 36, the position information contained in the footprint information, and also based on a size, a field angle, and so on of the imaging area of the photographing unit 40. When the footprint information corresponds to the imaging range of the photographing unit 40, the AR tag of the shape corresponding to the value of the type of the footprint information is displayed in a position corresponding to the position information contained in the footprint information in an orientation corresponding to the orientation contained in the footprint information.

The user can go up to a desired destination by following AR tags displayed on the display unit 32 of the mobile phone 1b. For example, when the user is around the exit of the station S1, as illustrated at Step S22 of FIG. 12, an AR tag A1 having a flag shape indicating "Start" and AR tags A2 to A4 having an arrow shape indicating "Straight" superimposed on the image captured by the photographing unit 40 are displayed. The AR tag A1 is displayed based on the footprint information recorded at the time of starting the recording and having type of "Start". The AR tags A2 to A4 are displayed based on pieces of footprint information recorded at points P2 to P4 (not illustrated) and having type of "Straight", respectively. In this case, display positions of the AR tags are adjusted so that the AR tags (A1 to A4) nearer to the mobile phone 1b are sequentially displayed from the lower part of the display unit 32.

When the user approaches the point P6, as illustrated at Step S23 of FIG. 12, AR tags A6 and A7 having an arrow shape indicating "Straight" and an AR tag A8 having a left turning arrow indicating "Left turn" superimposed on the image captured by the photographing unit 40 are displayed. The AR tags A6 and A7 are displayed based on the footprint information recorded at the points P6 and P7 and having type of "Straight". The AR tag AB is displayed based on the footprint information recorded at the point P8 and having type of "Left turn".

When the user approaches the point P10, as illustrated at Step S24 of FIG. 12, an AR tag A10 having an arrow shape indicating "Straight" and an AR tag A11 having a flag shape indicating "Goal" superimposed on the image captured by the photographing unit 40 are displayed. The AR tag A10 is displayed based on the footprint information recorded at the point P10 and having type of "Straight". The AR tag A11 is displayed based on the footprint information recorded at the end of the recording and having type of "Goal".

In this manner, in the footprint-information management system according to the present embodiment, the user can record the moving route without using map information by performing a simple operation and moving while holding the mobile phone 1a. In addition, users authorized to access the footprint information can be restricted, and therefore the user who records the moving route can inform only a specific person about the moving route.

In the footprint-information management system according to the present embodiment, the footprint information is reproduced based on the AR technology. Therefore, the user who uses the footprint information can access the recorded moving route in a very easy-to-understand way. Moreover, because the user who uses the footprint information can refer only to the footprint information for a specific moving route, the user can quickly check out directions to the destination without being bothered with unnecessary AR tags.

The screen transitions illustrated in FIG. 7 and FIG. 12 are examples, and therefore a sequence of operations and how to specify information are not limited to these examples. For example, when a moving route is to be recorded, it may be configured to store footprint information in the storage unit 24 until user's arrival at the destination, cause information for the name of the footprint information and access-authorized viewers to be input at the time of the arrival at the destination, and collectively transmit the information together with the stored footprint information to the server. When the moving route is to be displayed, the footprint information corresponding to the moving route within a predetermined range from the current location may be automatically selected from among the footprint information that the user can access, instead of causing the user to select the footprint information to be reproduced based on the name.

Figure 13:
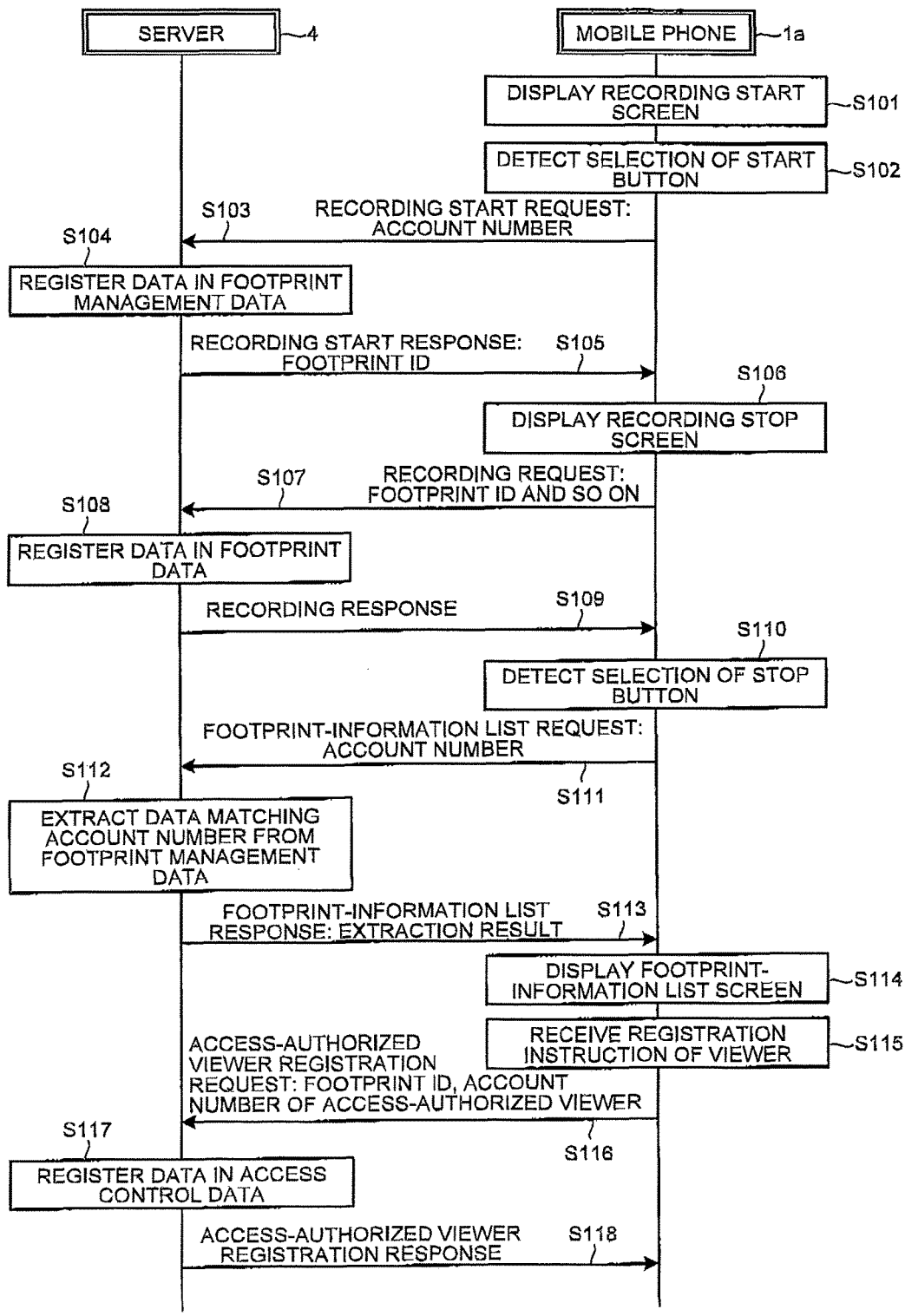
FIG. 13 is a sequence diagram illustrating a process flow when footprint information is recorded.
Figure 14:
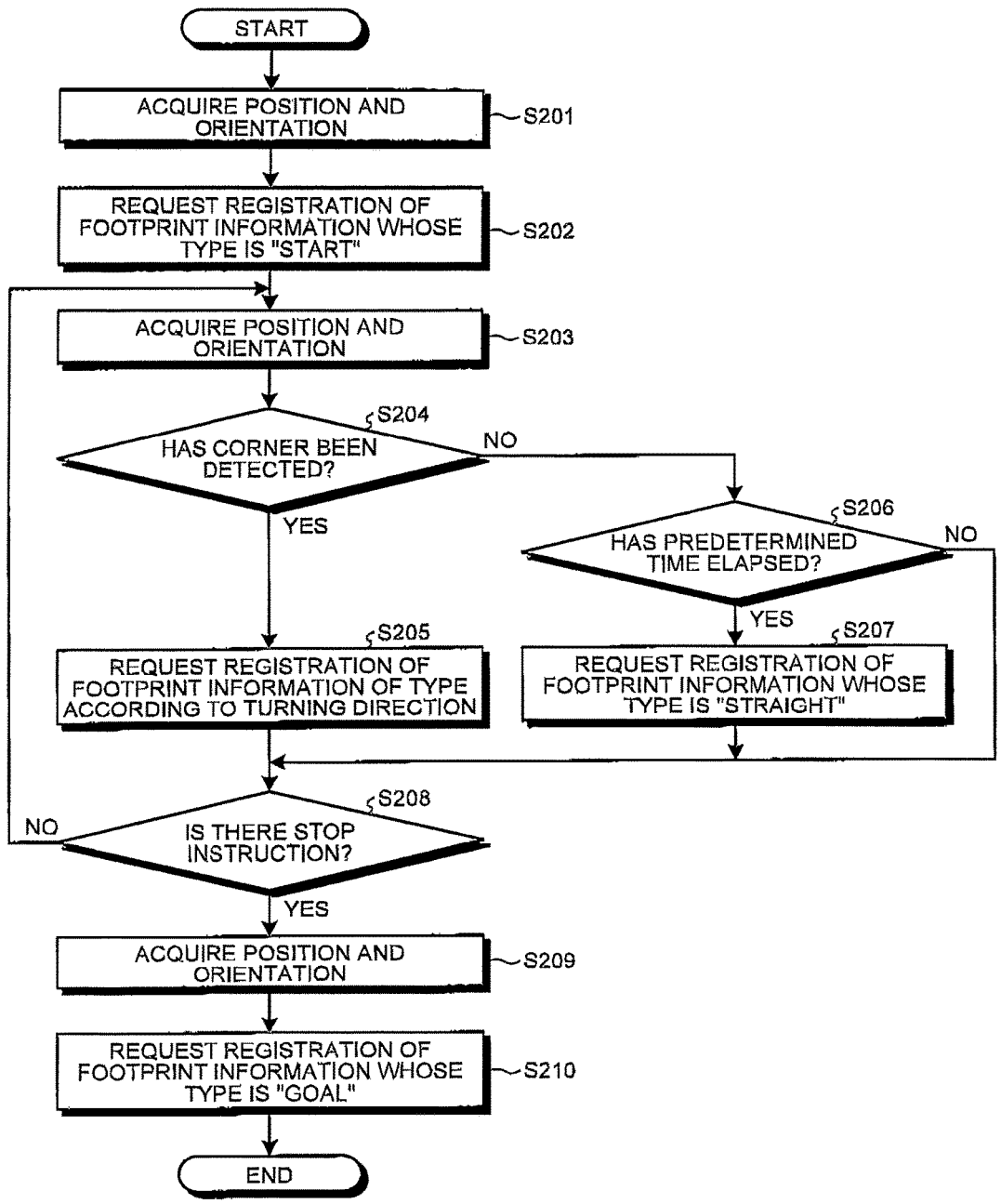
FIG. 14 is a flowchart illustrating a procedure of a footprint-information recording process.
Figure 15:
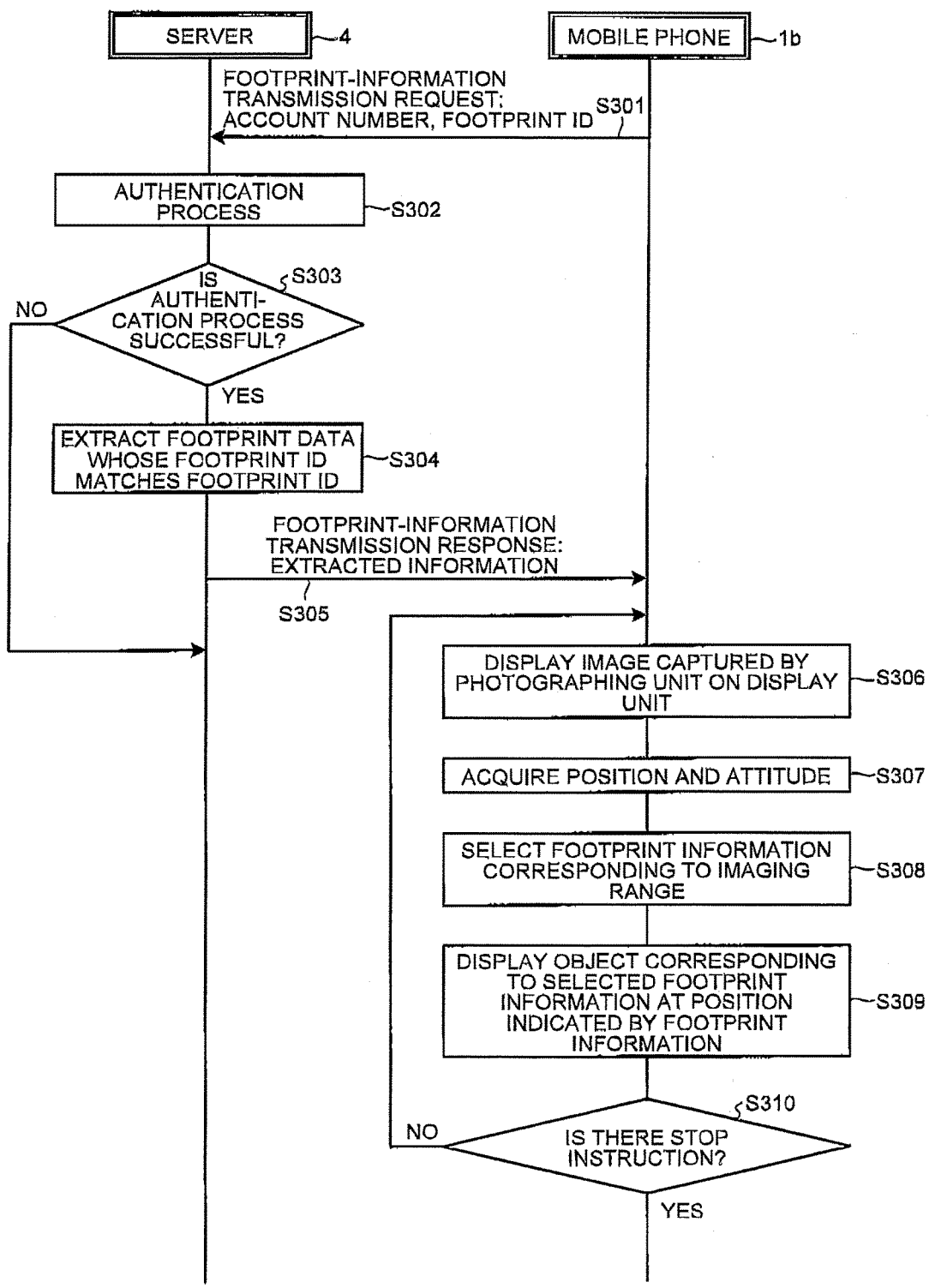
FIG. 15 is a sequence diagram illustrating a process flow when footprint information is reproduced.

Next, the operation of the footprint-information management system according to the present embodiment will be explained below with reference to FIG. 13 to FIG. 15. FIG. 13 is a sequence diagram illustrating a process flow when footprint information is recorded. FIG. 14 is a flowchart illustrating a procedure of a footprint-information recording process. FIG. 15 is a sequence diagram illustrating a process flow when footprint information is reproduced.

As illustrated in FIG. 13, at the time of recording footprint information, first, the mobile phone 1a displays the recording start screen on the display unit 32 at Step S101, as illustrated at Step S11 of FIG. 7. Then, the mobile phone 1a detects selection of the start button at Step S102, and transmits a recording start request including an account number and so on to the server 4 at Step S103.

When receiving the recording start request, at Step S104, the server 4 issues an footprint ID and registers the footprint ID together with the received account number and so on in the footprint management data 44b. At Step S105, the server 4 returns a recording start response including the issued footprint ID to the mobile phone 1a.

When receiving the recording start response, at Step S106, the mobile phone 1a displays the recording stop screen on the display unit 32 as illustrated at Step S12 of FIG. 7. The mobile phone 1a executes the footprint-information recording process, explained later, and stores the footprint information in the server 4. During execution of the footprint-information recording process, operations are repeated in such a manner that the mobile phone 1a transmits a recording request including the footprint ID and so on to the server 4 at Step S107, and that the server 4 registers the data in the footprint data 44c at Step S108 and returns a recording response at Step S109. Details of the processes of the mobile phone 1a from Steps S107 to S109 will be explained later.

At Step S110, when detecting selection of the stop button, the mobile phone 1a ends the footprint-information recording process. The mobile phone 1a then transmits a footprint-information list request including the account number to the server 4, at Step S111.

When receiving the footprint-information list request, at Step S112, the server 4 extracts data that matches the account number or the like of which value is received, from the footprint management data 44b. The server 4 returns a footprint-information list response including the result of extraction to the mobile phone 1a, at Step S113.

When receiving the footprint-information list response, at Step S114, the mobile phone 1a displays the footprint-information list screen including a list of returned footprint information on the display unit 32 as illustrated at Step S13 of FIG. 7. The mobile phone 1a receives a registration instruction of a viewer from the user at Step S115, and transmits an access-authorized viewer registration request including the footprint ID and the account number of the received access-authorized viewer to the server 4, at Step S116.

When receiving the access-authorized viewer registration request, at Step S117, the server 4 registers the footprint ID and the account number included in the access-authorized viewer registration request in association with each other in the access control data 44d. The server 4 returns an access-authorized viewer registration response to the mobile phone 1a, at Step S118.

As illustrated in FIG. 14, during the footprint-information recording process, first, mobile phone 1a acquires the current position and orientation of the own device from the position and attitude detector 36, at Step S201. Then, the mobile phone 1a requests registration of the footprint information that includes the acquired position and orientation and has a type of "Start" to the server 4, at Step S202.

The mobile phone 1a acquires the current position and orientation of the own device from the position and attitude detector 36, at Step S203. The mobile phone 1a then determines whether a corner has been detected based on a change in the orientation, at Step S204. When the corner has been detected (Yes at Step S204), the mobile phone 1a requests registration of the footprint information including the acquired position and having a type according to the turning direction, to the server 4, at Step S205. As for a portion of the corner, an orientation before the turning may be recorded or an orientation after the turning may be recorded as the orientation.

To prevent erroneous detection of the corner when the orientation of the own device changes for a reason that the user looks aside or for some other reasons, how the orientation changes may be monitored for a predetermined period of time instead of registering the footprint information immediately after the change in the orientation is detected. In this case, if the orientation of the own device returns to its former orientation within the predetermined period of time, then the mobile phone 1a determines that the corner is not detected. Meanwhile, if the orientation of the own device does not return to its former orientation within the predetermined period of time, then the mobile phone 1a determines that the corner is detected, and requests registration of the footprint information including the position before the predetermined Period of time elapses and having a type according to the turning direction, to the server 4.

Alternatively, instead of the acquired orientation, the corner may be detected by tracing the positions of the mobile phone 1a. For example, when, among six points continuously recorded, a line connecting the three points in a first half thereof and a line connecting the three points in a second half thereof are perpendicular to each other, the point where the lines intersect to each other can be determined as the corner. In this case, the mobile phone 1a requests registration of the footprint information including the point where the lines intersect to each other and having a type according to the turning direction, to the server 4.

When the corner has not been detected (No at Step S204), the mobile phone 1a determines whether a predetermined time has elapsed, at Step S206. The time based on the elapse of the predetermined time is a later time either one of the start time of the footprint-information recording process and the time at which the registration of the footprint information is last required. When the predetermined time has elapsed (Yes at Step S206), the mobile phone 1a requests registration of the footprint information that includes the acquired position and orientation and has a type of "Straight", to the server 4, at Step S207. At this time, the direction of the footprint information indicating "Straight" is the same as the acquired orientation.

After the request of the registration of the footprint information from the server 4 at Step S205 or Step S207 in the above manner, the mobile phone 1a determines whether the user has performed the operation of instructing a stop of the footprint-information recording process, at Step S208. When the corner has not been detected (No at Step S204) and the predetermined time has not elapsed (No at Step S206), the mobile phone 1a also performs determination at Step S208.

When there is no stop instruction (No at Step S208), the mobile phone 1a again executes Step S203 and the subsequent steps. When there is the stop instruction (Yes at Step S208), the mobile phone 1a acquires the current position and orientation of the own device from the position and attitude detector 36, at Step S209. The mobile phone is requests registration of the footprint information that includes the acquired position and orientation and has a type of "Goal", to the server 4, at Step S210. As registration of the footprint information in the server 4, a registration request of a plurality of pieces of footprint information may be collectively sent to the server 4 at a timing of sending a registration request of the footprint information being "Goal" based on the position information and the orientation acquired from the start to the stop.

As illustrated in FIG. 15, when the footprint information is to be reproduced, first, the mobile phone 1b transmits a footprint-information transmission request including an account number and a footprint ID to the server 4, at Step S301. Before the transmission of the footprint-information transmission request, a list of results of inquiries to the server 4 about the footprint information that the user can access may be displayed as illustrated at Step S21 of FIG. 12, and the user may select which footprint information should be reproduced.

When receiving the footprint-information transmission request, at Step S302, the server 4 performs an authentication process as to whether the user corresponding to the account number included in the footprint-information transmission request can access the footprint information corresponding to the footprint ID included in the footprint-information transmission request. Specifically, the server 4 determines whether a combination of the account number and the footprint ID included in the footprint-information transmission request is contained in the access control data 44d, and determines that the authentication is successful when the combination is contained therein.

When the authentication is not successful (No at Step S303), the server 4 ignores the request and does not perform any more particular process. When the authentication is successful (Yes at Step S303), the server 4 extracts the footprint information whose footprint ID matches the footprint ID included in the footprint-information transmission request from the footprint data 44c, at Step S304. The server 4 then returns a footprint-information transmission response including the extracted footprint information to the mobile phone 1b, at Step S305.

When receiving the footprint-information transmission response, the mobile phone 1b reproduces the footprint information included in the footprint-information transmission response as follows. That is, the mobile phone 1b displays the image captured by the photographing unit 40 on the display unit 32 at Step S306. The mobile phone 1b acquires the position and the attitude detected by the position and attitude detector 36 at Step S307, and selects the footprint information corresponding to the imaging range of the photographing unit 40 based on the acquired position, attitude, and so on, at Step S308. The mobile phone 1b displays objects (AR tags) having shapes according to the values of the types of the selected footprint information at the positions indicated by respective pieces of footprint information, at Step S309.

The mobile phone 1b determines whether the user has performed the operation of instructing a stop of reproduction of the footprint information, at Step S310. When the stop instruction has not been performed (No at Step S310), the mobile phone 1b again executes Step S306 and the subsequent steps. Meanwhile, when the stop instruction has been performed (Yes at Step S310), the mobile phone 1b stops the reproduction of the footprint information.

As explained above, in the present embodiment, the footprint information is recorded and reproduced as AR tags, and this enables to achieve recording and reproduction of moving route without using map information.

The aspects of the present invention represented in the embodiment can be arbitrarily modified without departing from the spirit of the present invention. For example, in the embodiment, the process related to display of AR tags is executed by the mobile phone 1b; however, the process may be executed by a server such as the server 4. In this case, the mobile phone 1b transmits an image captured by the photographing unit 40 and the position and the attitude of the mobile phone 1b detected by the position and attitude detector 36 to the server, and displays a processed image returned from the server on the display unit 32.

In the embodiment, the mobile phone 1a records the footprint information, and the mobile phone 1b reproduces the footprint information; however, it may be configured so that a single mobile electronic device can perform both the recording and the reproduction of the footprint information. In this case, for example, one mobile electronic device has only to store both the footprint-information recording program 24a and the footprint-information reproduction program 24e.

In the embodiment, the footprint ID and the account number are used to perform the authentication process; however, to enhance security, a password may also be used. In this case, different passwords may be used for each footprint ID.

In the embodiment, the server 4 performs access control based on the stored access control data 44d; however, the access control may be achieved by informing only a specific acquaintance about a uniform resource locator (URL) or the like including a code to access the recorded footprint information by mail or so. In this case, by using a sufficiently complicated code, a third party who is not informed about the code cannot substantially access the footprint information corresponding to the code.

In the embodiment, the footprint information is recoded at predetermined time intervals; however, the footprint information may be recorded at each predetermined movement distance.

In the embodiment, the mobile phone 1a causes the server 4 to store the footprint information; however, the mobile phone 1a may directly send the footprint information to a terminal of the party the user wishes to inform about the moving route by mail or so.

In the embodiment, the footprint ID is used to specify a set of footprint information indicating a moving route; however, a set of footprint information indicating a moving route may be specified without using the footprint ID. For example, it may be configured to extract footprint information in which a generated time or an associated position falls within a predetermined range and to display the moving route based on the extracted footprint information.

In the embodiment, the mobile phone 1a starts the recording of the footprint information, triggered by the user's operation; however, the trigger to start the recording of the footprint information is not limited thereto. An example of starting the recording of the footprint information triggered by some other event will be explained below with reference to FIG. 16 and FIG. 17.

Figure 16:
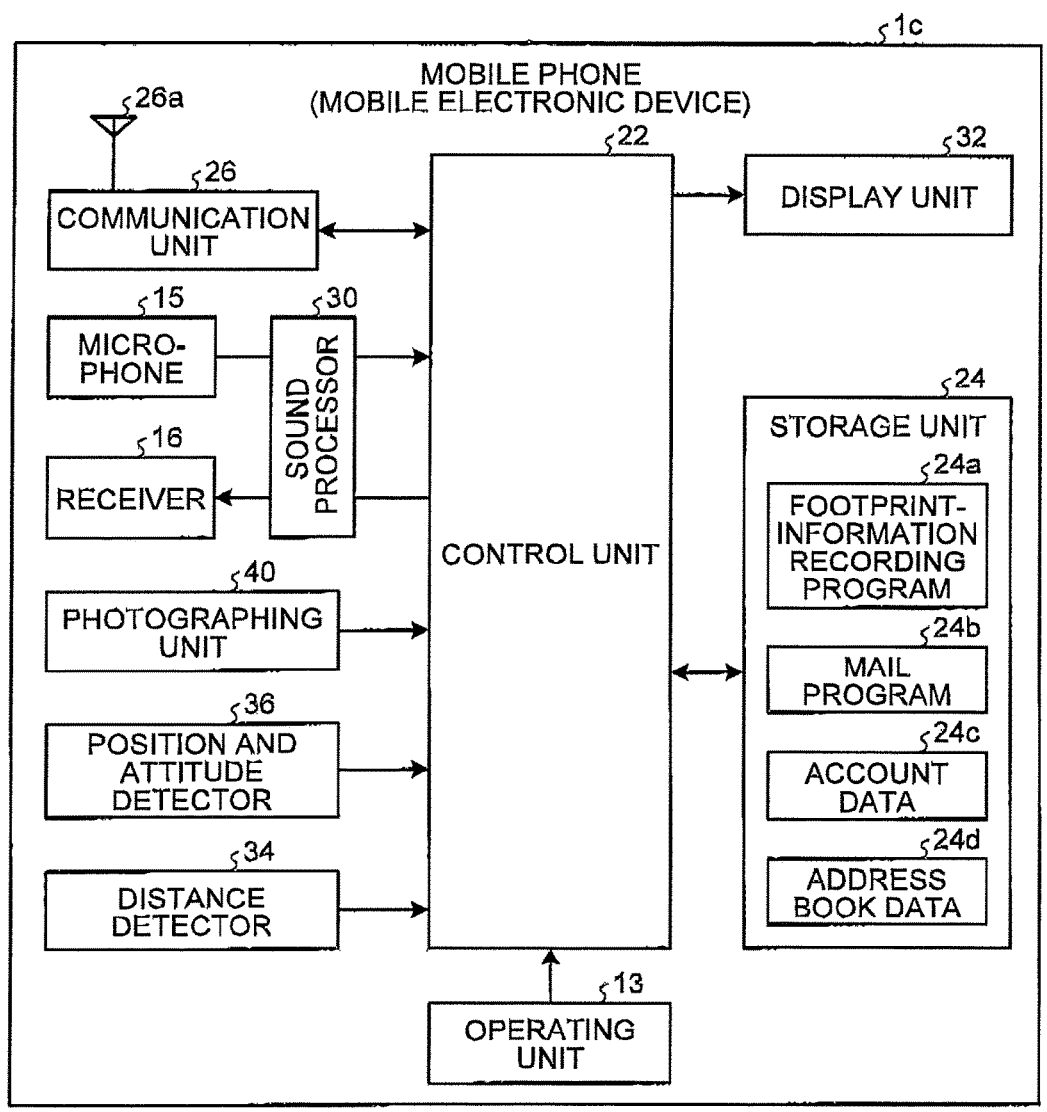
FIG. 16 is a block diagram of a third mobile phone.

A mobile phone 1c illustrated in FIG. 16 starts recording the footprint information when a distance to a previously associated mobile phone is a predetermined value or more. For example, a parent gives the mobile phone 1c to his/her child and previously associates it with the mobile phone 1b held by himself/herself. Thereby, even if the child gets lost, the parent reproduces the footprint information, so that the child can be found immediately.

As illustrated in FIG. 16, the mobile phone 1c is different from the mobile phone 1a in a point that a distance detector 34 is further added thereto. The distance detector 34 detects a distance to the previously associated mobile phone. The distance detector 34 only has to detect at least that the distance to the previously associated mobile phone is a predetermined threshold or more. The distance detector 34 detects the distance based on, for example, the intensity of radio waves emitted by the previously associated mobile phone. Alternatively, for example, the mobile phone may acquire the position information of the previously associated mobile phone through a network, compare the acquired position information with the current position information of its own device acquired by the position and attitude detector, and calculate a distance to the previously associated mobile phone.

Figure 17:
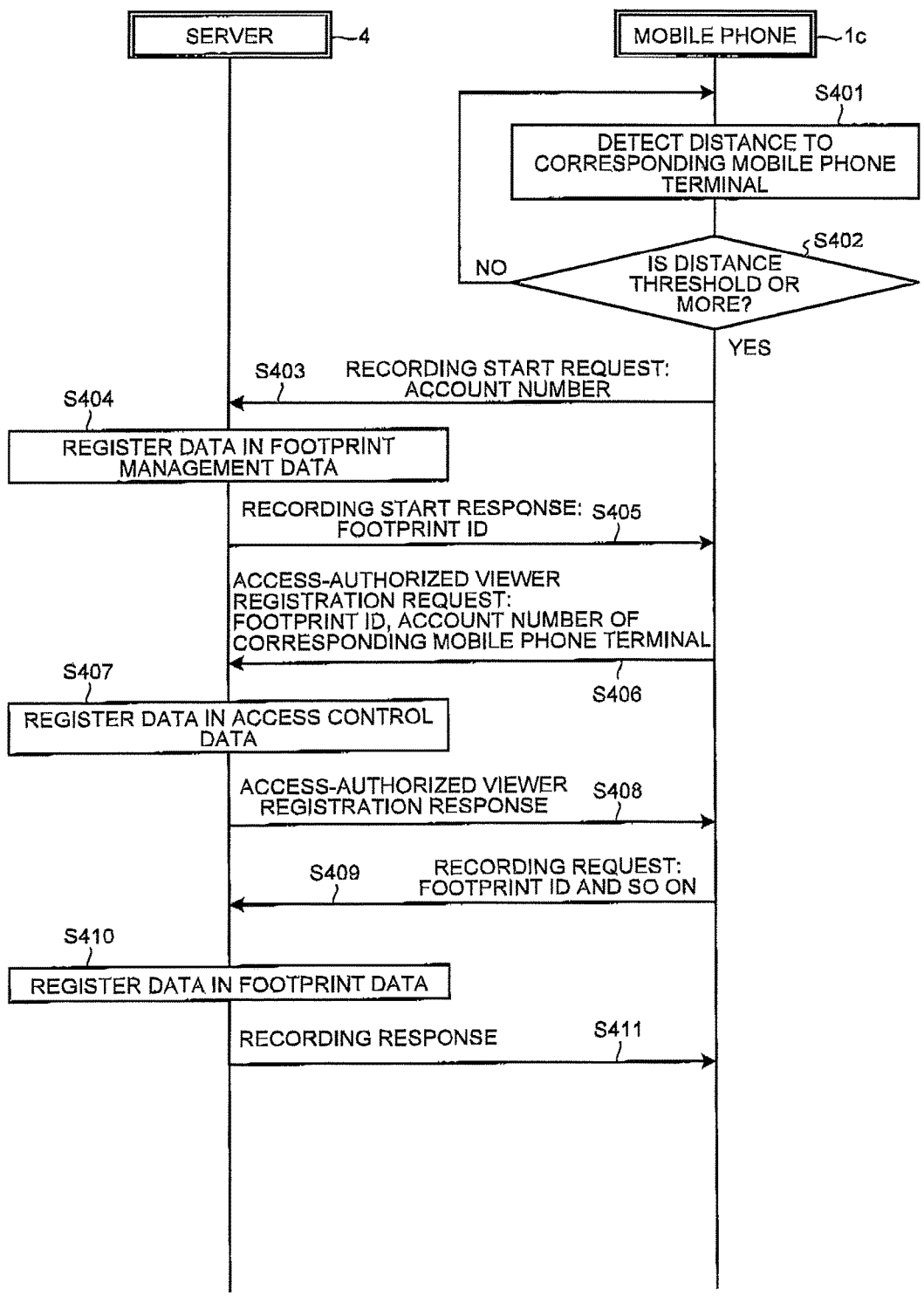
FIG. 17 is a sequence diagram illustrating a modification of the process flow when footprint information is recorded.

As illustrated in FIG. 17, the mobile phone 1c detects a distance to a corresponding mobile phone, at Step S401. When the distance to the corresponding mobile phone is not a threshold or more (No at Step S402), the mobile phone 1c again executes Step S401 and the subsequent steps. When the distance to the corresponding mobile phone is the threshold or more (Yes at Step S402), the mobile phone 1c starts recording the footprint information as follows.

First, the mobile phone 1c transmits a recording start request including an account number and so on to the server 4, at Step S403. When receiving the recording start request, at Step S404, the server 4 issues an footprint ID and registers the footprint ID together with the received account number and so on in the footprint management data 44b. At Step S405, the server 4 returns a recording start response including the issued footprint ID to the mobile phone 1c.

When receiving the recording start response, at Step S406, the mobile phone is transmits an access-authorized viewer registration request including a footprint ID and an account number of the user of the corresponding mobile phone to the server 4. The account number of the user of the corresponding mobile phone is previously stored in, for example, the account data 24c.

When receiving the access-authorized viewer registration request, at Step S407, the server 4 registers the footprint ID and the account number included in the access-authorized viewer registration request in association with each other in the access control data 44d. The server 4 then returns an access-authorized viewer registration response to the mobile phone 1c, at Step S408.

When receiving the access-authorized viewer registration response, the mobile phone 1c executes the footprint-information recording process, and causes the server 4 to store the footprint information. During execution of the footprint-information recording process, operations are repeated in such a manner that the mobile phone 1c transmits a recording request including the footprint ID and so on to the server 4 at Step S409, and that the server 4 registers the data in the footprint data 44c at Step S410 and returns a recording response at Step S411.

The footprint-information recording process is stopped when the distance to the corresponding mobile phone is the threshold or less or when a predetermined operation is performed. Whether to start the recording of the footprint information when the distance to the previously associated mobile phone is the predetermined value or more is preferably changed if needed by the setting. It is also preferable that the setting can be changed in the side of the corresponding mobile phone.

The device that starts the recording of the footprint information when the distance to the previously associated mobile phone is the predetermined value or more is not limited to the mobile phone. For example, an in-vehicle navigation device may be provided with a function of starting the recording of the footprint information when the distance to the previously associated mobile phone is the predetermined value or more. In this case, the corresponding mobile phone is a mobile phone of a vehicle's owner. By providing such a function as above for the navigation device, the vehicle's owner can quickly find the vehicle even if it has been towed away or it has been stolen.

The advantages of one embodiment of the invention are that the moving route can be recorded without using map information.

What is claimed is:

1. A mobile electronic device, comprising:
    a detector unit configured to
        detect a position and an orientation of the mobile electronic device, and
        monitor the orientation of the mobile electronic device for a predetermined period when the detector unit detects a change of the orientation of the mobile electronic device from a former orientation; and
    a control unit configured to
        determine that a corner is detected when the mobile electronic device does not return to the former orientation within the predetermined period, and
        determine that the corner is not detected when the mobile electronic device returns to the former orientation within the predetermined period.

2. The mobile electronic device according to claim 1, wherein
    the control unit is configured to start generating mark information, which indicates a moving route of the mobile electronic device, at each predetermined time interval or at each predetermined movement, when the corner is detected.

3. The mobile electronic device according to claim 1, wherein
    the control unit is configured to start generating mark information, which indicates a moving route of the mobile electronic device, at each predetermined time interval or at each predetermined movement, when the corner is detected, and
    the mark information includes information which indicates a user of the mobile electronic device turns a corner.

4. The mobile electronic device according to claim 1, wherein
    the control unit includes a processor.

5. A mobile electronic device, comprising:
    a detector unit configured to detect a position of the mobile electronic device;
    a distance detector unit configured to detect a distance from the mobile electronic device to a terminal associated with the mobile electronic device; and
    a control unit configured to
        generate mark information, which indicates a moving route of the mobile electronic device, based on the position of the mobile electronic device detected at each predetermined distance interval or at each predetermined time interval,
        start generation of the mark information when the detected distance becomes longer than a first threshold, and
        stop the generation of the mark information when the detected distance becomes shorter than a second threshold.

6. The mobile electronic device according to claim 5, wherein
    the control unit includes a processor.

7. A method executed by a mobile electronic device, the mobile electronic device including a detector unit and a control unit, the method comprising:
    detecting, by the detector unit, a position and an orientation of the mobile electronic device;
    monitoring, by the detector unit, the orientation of the mobile electronic device for a predetermined period when a change of the orientation of the mobile electronic device from a former orientation is detected;
    determining, by the control unit, that a corner is detected when the mobile electronic device does not return to the former orientation within the predetermined period; and
    determining, by the control unit, that the corner is not detected when the mobile electronic device returns to the former orientation within the predetermined period.

8. A method executed by a mobile electronic device, the mobile electronic device including a detector unit, a distance detector unit, and a control unit, the method comprising:
    detecting, by the detector unit, a position of the mobile electronic device;
    detecting, by the distance detector unit, a distance from the mobile electronic device to a terminal associated with the mobile electronic device; and
    generating, by the control unit, mark information, which indicates a moving route of the mobile electronic device, based on the position of the mobile electronic device detected at each predetermined distance interval or at each predetermined time interval, wherein
    generation of the mark information is started when the detected distance becomes longer than a first threshold, and
    the generation of the mark information is stopped when the detected distance becomes shorter than a second threshold.

* * * * *